United States Patent
Lee et al.

(10) Patent No.: US 8,160,185 B2
(45) Date of Patent: Apr. 17, 2012

(54) APPARATUS FOR SYNCHRONIZING OFDM SIGNAL USING OPEN-LOOP FREQUENCY SYNCHRONIZATION METHOD AND FREQUENCY OFFSET ESTIMATION SCHEME USING THE APPARATUS

(75) Inventors: Hwang-Soo Lee, Daejeon (KR);
Byung-Jik Keum, Daejeon (KR);
Moo-Hong Lee, Daejeon (KR);
Jeong-Han Jeong, Daejeon (KR);
Young-Serk Shim, Seoul (KR)

(73) Assignee: Korea Advanced Institute of Science and Technology (KR)

( * ) Notice: Subject to any disclaimer, the term of this patent is extended or adjusted under 35 U.S.C. 154(b) by 674 days.

(21) Appl. No.: 12/338,263

(22) Filed: Dec. 18, 2008

(65) Prior Publication Data
US 2010/0118990 A1      May 13, 2010

(30) Foreign Application Priority Data
Nov. 13, 2008 (KR) .......................... 10-2008-0112517

(51) Int. Cl.
*H04L 27/06* (2006.01)
(52) U.S. Cl. .......................... 375/344; 375/354; 375/260
(58) Field of Classification Search .................. 375/344, 375/346, 354, 260
See application file for complete search history.

(56) References Cited

U.S. PATENT DOCUMENTS 8,005,182 B2 * 8/2011 Park et al. ..................... 375/373
8,009,768 B1 * 8/2011 Lee et al. ..................... 375/340

FOREIGN PATENT DOCUMENTS

KR   1020060004729   1/2006
KR   1020080052864   6/2008

* cited by examiner

*Primary Examiner* — Kevin Kim
(74) *Attorney, Agent, or Firm* — The Belles Group, P.C.

(57) ABSTRACT

There are provided an apparatus for synchronizing an OFDM signal using an open-loop frequency synchronization method, which can estimate and compensate for various types of frequency errors generated in a frequency modulation broadcasting/communication system to which the open-loop frequency synchronization method is applied, and a frequency offset estimation scheme using the apparatus. To this end, the apparatus for synchronizing an OFDM signal using the open-loop frequency synchronization method comprises a time offset estimator, a time offset compensator, a fractional frequency offset estimator, an integer frequency offset estimator, a frequency offset controller and a frequency offset compensator. Accordingly, in the OFDM demodulation broadcasting/communication system using the open-loop frequency synchronization method, a frequency offset, which is generated due to the carrier frequency difference between a transmitter and a receiver, a frequency shift generated due to the mobile environment of a receiver, the temperature characteristic of a local oscillator, and the like, can be estimated and compensated.

10 Claims, 6 Drawing Sheets

APPARATUS FOR SYNCHRONIZING OFDM SIGNAL USING OPEN-LOOP FREQUENCY SYNCHRONIZATION METHOD AND FREQUENCY OFFSET ESTIMATION SCHEME USING THE APPARATUS

CROSS-REFERENCE TO RELATED APPLICATION

The present application claims priority under 35 U.S.C. §119(a) to Korean Patent Application No. 2008-0112517, filed on Nov. 13, 2008, the disclosure of which is hereby incorporated herein by reference in its entirety as if set forth fully herein.

FIELD OF THE INVENTION

The present invention relates to an apparatus for processing synchronizing an OFDM signal using an open-loop frequency synchronization method and a frequency offset estimation scheme using the apparatus.

BACKGROUND OF THE INVENTION

In general, an OFDM synchronization method in a broadcasting/communication system is divided into a frequency synchronization method and a time synchronization method. In the frequency synchronization method, a carrier frequency offset between the transmitter and the receiver and a frequency offset caused by the Doppler effect generated due to movement of the receiver are estimated and compensated. In the time synchronization method, a start position of an OFDM symbol is estimated and compensated.

In an OFDM system, a frequency offset causes inter-channel interference (ICI), which breaks the orthogonality between multi-carriers. Therefore, performance of a receiver is lowered.

In the time synchronization method, when a start position of a symbol is not correctly estimated, inter-symbol interference (ISI) occurs, and therefore, performance of a receiver is also lowered. Conventionally, such a problem was overcome using a cyclic prefix.

That is, a cyclic prefix is inserted into a symbol so that a serious error is not generated even though time synchronization is not correct.

However, performance of the receiver is very sensitive to frequency offset and considerably influenced by the accuracy of frequency synchronization.

Hereinafter, such conventional problems will be described in detail with reference to a terrestrial digital multimedia broadcasting (T-DMB) system using an OFDM synchronization method.

FIG. 1 shows the structure of a transmission frame in a conventional prior art T-DMB system. As shown in FIG. 1, the transmission frame in the T-DMB system comprises a synchronization channel 110, a fast information channel (FIC) 120 and a main service channel (MSC).

The synchronization channel 110 is a channel for transmission frame synchronization, and comprises a null symbol 111 which has no signal and a phase reference symbol 112 which becomes a reference for decoding DQPSK signals. The null symbol 111 is a period in which there is no signal, and a receiver obtains approximate time synchronization using an energy ratio of the null symbol 111 and the PRS 112. The PRS 112 contains information known by both receiver and transmitter. Accordingly, the receiver can obtain precise time synchronization and exact fractional frequency synchronization using the information.

The T-DMB transmission frame comprises a total of 76 (PRS+FIC+MSC) OFDM symbols 140 except for the null symbol 111. A cyclic prefix (CP) 141 is inserted into each of the OFDM symbols 140.

The CP 141 is a kind of guard time for extending an OFDM symbol period, and the continuity of a signal is maintained by copying an end of the OFDM symbol 140 and inserting the copied end into a head of the OFDM symbol 140. Accordingly, although a receiver does not obtain precise time synchronization, an error is not generated in a data decoding process due to the CP.

The receiver estimates a fractional frequency offset using properties of the CP 141.

The frequency synchronization method includes a closed-loop synchronization method and an open-loop synchronization method. The closed-loop synchronization method is a method in which a frequency offset is compensated by adjusting the frequency of a local oscillator to the opposite direction using a frequency offset that is estimated in a signal processing stage and feedback to the local oscillator.

In the closed-loop synchronization method, the cause of a frequency offset is removed, but estimation of a frequency offset and compensation time through a feedback loop are delayed as compared with those in the open-loop synchronization method. Therefore, changes in frequency offset are not rapidly managed. Further, performance is different depending on characteristics of the local oscillator.

On the contrary, the open-loop synchronization method is a method in which a frequency offset is estimated and immediately compensated in a signal processing stage.

In the open-loop synchronization method, a load for performing signal process in a digital stage is high. However, performance is not sensitive to characteristics of an oscillator and constant performance is maintained like in the closed-loop synchronization method. Further, since compensation for a data having an estimated frequency offset is immediately possible, there is no time delay for compensating for a frequency offset.

FIG. 2 shows the structure of a T-DMB receiver to which a conventional open-loop frequency synchronization method is applied.

As shown in FIG. 2, the T-DMB receiver comprises an antenna 201, a low noise amplifier (LNA) 202, a mixer 203, a local oscillator 204, a band pass filter 205, an analog-to-digital converter (ADC) 206, a baseband digital signal processing unit 207 and an A/V codec 208.

The LNA 202 amplifies signals inputted to the antenna 201, and the mixer 203 transfers the amplified signals into a baseband signal. At this time, the mixer 203 uses a signal generated from the local oscillator 204. When the carrier frequency of the signal is different from that of a transmitter, a frequency offset is generated.

The band pass filter 205 removes an unnecessary signal in the amplified signals. The ADC 206 converts the amplified signals into digital signals and outputs the converted signals to the digital signal processing unit 207.

The digital signal processing unit 207 comprises a time offset estimator 271, a fractional frequency offset estimator 272, an integer frequency offset estimator 273, a time/frequency offset compensator 274, an OFDM demodulator 275 and a channel decoder 276.

The time offset estimator 271 estimates an OFDM symbol start position and a frame start position. The fractional frequency offset estimator 272 estimates a frequency offset that becomes fraction times of the interval of a sub-carrier. The integer frequency offset estimator 273 estimates a frequency offset that becomes integer times of the interval of a sub-carrier. The time/frequency offset compensator 274 adjusts the frame and OFDM symbol start positions and compensates for a frequency offset using the estimated time and frequency offset information.

The OFDM demodulator 275 demodulates a digital signal using FFT, and the channel decoder corrects errors of the digital signal. The A/V codec 208 restores the digital signal to video and audio signals.

Here, an algorithm used in frequency offset estimation, i.e., an algorithm used in integer frequency offset estimation will be described. A position of a subcarrier on a frequency axis that gives a maximum correlation value between a knwn PRS and a received PRS is detected while moving the received PRS a signal on a frequency axis as the interval of the sub-carrier. Here, the spacing difference between the position of the known PRS and that of the received PRS that gives a maximum value becomes an integer frequency offset.

At this time, since performance of the algorithm can be deteriorated due to the influence of a time offset, an algorithm based on a partial correlation value may be used to remove the influence of the time offset.

In the T-DMB system, the signal known by the receiver is only the PRS. Therefore, the integer frequency offset can be estimated using PRS in the frame once.

In the fractional frequency offset estimation, properties of a CP are used on a time axis, unlike in the integer frequency offset estimation. The CP is formed by copying an end of an OFDM symbol and inserting the copied end into a head of the OFDM symbol. The fractional frequency offset using a CP is estimated using a phase difference between data in a received signal, which is caused by a frequency offset.

An expression for the fractional frequency offset estimation is as follows;

$$FFO = \frac{1}{2\pi}\tan^{-1}\left[\sum_{n=0}^{N_g-1} z_r(-N_g+n) \cdot z_r^*(N_e - N_g + n)\right] \quad \text{[Equation 1]}$$

Here, the range of a fractional frequency offset is limited by the aforementioned characteristics of the algorithm. That is, it is possible to perform estimation up to $-0.5 \cdot L_{ss}$ to $+0.5 \cdot L_{ss}$ ($L_{ss}$: interval of a sub-carrier) due to the property of $\tan^{-1}$.

FIG. 3 shows various frequency offset values to be estimated by a fractional frequency offset estimation algorithm. Since FF01 and FF02 are within a range of the fractional frequency offset estimation, they can be estimated. On the other hand, since FF03 and FF04 are out of the range, they are estimated as FF05 and FF06, respectively.

When FF01 is changed into FF03 due to the aforementioned shift of the local oscillator, FF01 is out of the range of the fractional frequency offset estimation and estimated as a wrong value. Therefore, frequency synchronization is not correct, and data is not properly decoded by the receiver.

SUMMARY OF THE INVENTION

The present invention is conceived to solve the aforementioned problems. Accordingly, the present invention is provided to estimate and compensate for a frequency offset generated due to the carrier frequency difference between a transmitter and a receiver in an OFDM demodulation broadcasting/communication system using an open-loop frequency synchronization method.

The present invention is also provided to estimate and compensate for a carrier frequency shift generated due to the mobile environment of a receiver, the temperature characteristic of a local oscillator and the like.

According to an aspect of the present invention, there is provided an apparatus for synchronizing an OFDM signal using an open-loop frequency synchronization method, which comprises an OFDM receiver comprising a low noise amplifier (LNA) amplifying a signal received from an antenna, a mixer converting the amplified signal into a baseband signal using a clock frequency generated from a local oscillator, a band pass filter extracting and outputting a specific signal in the baseband signal, and an analog-to-digital converter (ADC) converting the extracted signal into a digital signal; a time offset estimator estimating a start position of an OFDM symbol and a start position of a frame with respect to the digital signal; a time offset compensator compensating for the start position of the OFDM symbol and the start point of the frame; a fractional frequency offset estimator estimating a frequency offset that becomes fraction times of an interval of a sub-carrier in response to a signal inputted from the time offset estimator; an integer frequency offset estimator estimating a frequency offset that becomes integer times of the interval of the sub-carrier in response to the signal inputted from the time offset estimator; a frequency offset controller estimating a change in frequency offset that becomes integer times of the interval of the sub-carrier using the frequency offset that becomes fraction times of the interval of the sub-carrier; and a frequency offset compensator compensating the frequency offset using the start position of the OFDM symbol and the start point of the frame based on the estimated change in frequency offset.

The apparatus according to the present invention may further comprise a switch controlling an operation of the integer frequency offset estimator and an operation of the frequency offset controller based on the estimation result of the frequency offset that becomes fraction times of the interval of the sub-carrier.

The frequency offset controller may estimate a frequency offset shift using an integer frequency offset estimated by the integer frequency offset estimator using a phase reference symbol (PRS), a frequency offset of a previous OFDM symbol, and a fractional frequency offset of a current OFDM symbol, and a fractional frequency offset of a previous OFDM symbol.

The frequency offset controller may estimate an integer frequency offset using a PRS, and detect a frequency offset of the current OFDM symbol by adding the fractional frequency offset of the current OFDM symbol to the integer frequency offset.

The frequency offset controller may detect a difference value of the frequency offset of an OFDM symbol by subtracting a frequency offset of the current OFDM symbol from the frequency offset of the previous OFDM symbol, and determine whether or not a frequency shift and a frequency offset (FOS) estimation error are generated by comparing the difference value of the frequency offset of the OFDM symbol with a first threshold value.

The frequency offset controller may determine that the frequency shift is generated when the difference value of the frequency offset of the OFDM symbol is greater than a second threshold value by comparing the difference value of the frequency offset of the OFDM symbol with the second threshold value, and determine that the FOS estimation error is generated when the difference value of the frequency offset of the OFDM symbol is smaller than a second threshold value.

The frequency offset controller may determine whether the frequency shift is generated in a positive or negative drift by comparing the fractional frequency offset of the OFDM symbol when the difference value of the frequency offset of the OFDM symbol is greater than a second threshold value, and increase the integer frequency offset by 1 when the frequency shift is generated in the positive drift and decrease the integer frequency offset by 1 when the frequency shift is generated in the negative drift.

The frequency offset controller may compensate for the frequency offset by substituting the frequency offset of the previous OFDM symbol for the frequency offset of the current OFDM symbol when the difference value of the frequency offset of the OFDM symbol is smaller than a second threshold value.

According to another aspect of the present invention, there is provided a frequency offset estimation scheme using an apparatus for synchronizing an OFDM signal, which comprises the steps of (a) estimating a start position of an OFDM symbol and a start position of a frame with respect to a digital signal; (b) compensating the start position of the OFDM symbol and the start position of the frame; (c) estimating a frequency offset that becomes fractional times of an interval of a sub-carrier in response to a signal inputted at step (a); (d) estimating a frequency offset that becomes integer times of the interval of the sub-carrier based on the frequency offset estimation result; (e) estimating a change in frequency offset that becomes integer times of the interval of the sub-carrier using the frequency offset that becomes fractional times of an interval of a sub-carrier; and (f) compensating and outputting the frequency offset using the start position of the OFDM symbol and the start position of the frame based on the estimated change in frequency offset.

The frequency offset estimation scheme according to the present invention may further comprise a step of controlling operations at steps (c) and (d) based on step (b).

According to the present invention, a frequency offset generated due to the carrier frequency difference between a transmitter and a receiver can be estimated and compensated in an OFDM demodulation broadcasting/communication system using an open-loop frequency synchronization method.

Further, a frequency shift generated due to the mobile environment of a receiver, the temperature characteristic of a local oscillator and the like is estimated and compensated, so that it is possible to prevent performance of the receiver from being deteriorated.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF THE DRAWINGS

Hereinafter, an apparatus for synchronizing an OFDM signal using an open-loop frequency synchronization method and a frequency offset estimation scheme using the apparatus according to the present invention will be described in detail with reference to the accompanying drawings.

Figure 1:
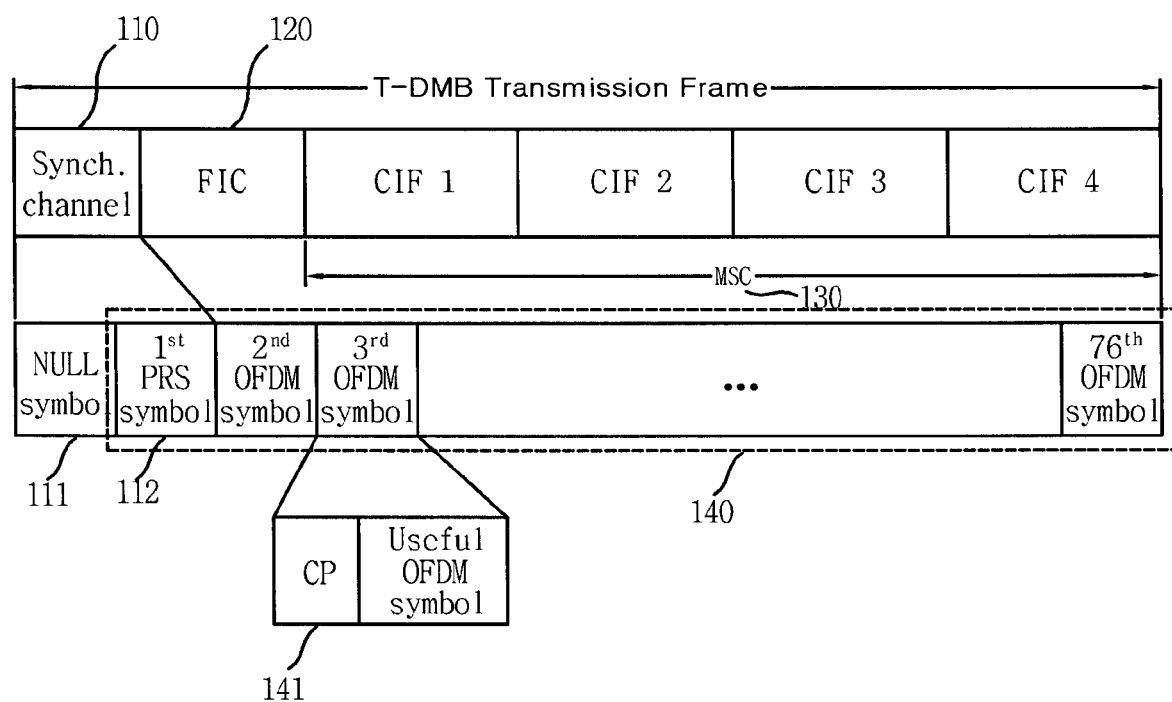
FIG. 1 is a block diagram showing the structure of a transmission frame in a conventional prior art T-DMB system.
Figure 2:
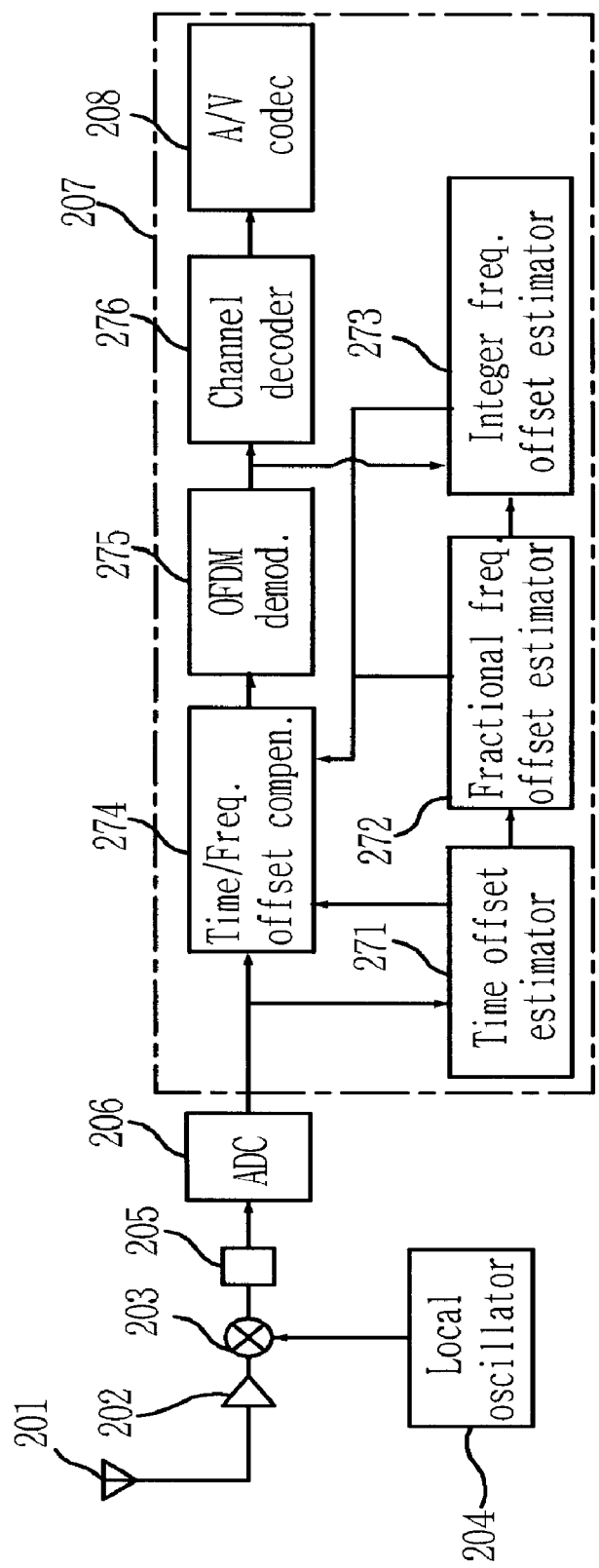
FIG. 2 is a block diagram of a conventional prior art T-DMB receiver to which an open-loop frequency synchronization method is applied.
Figure 3:
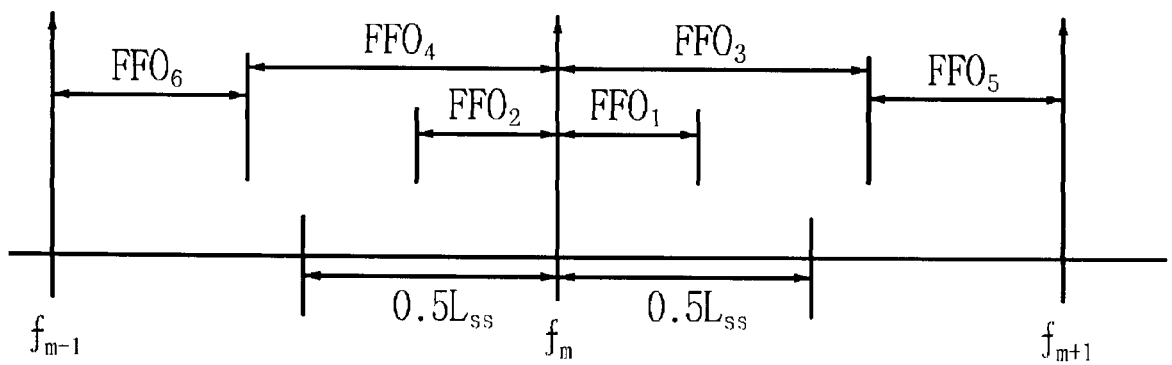
FIG. 3 is a view showing various frequency offset values to be estimated by a fractional frequency offset estimation algorithm.
Figure 4:
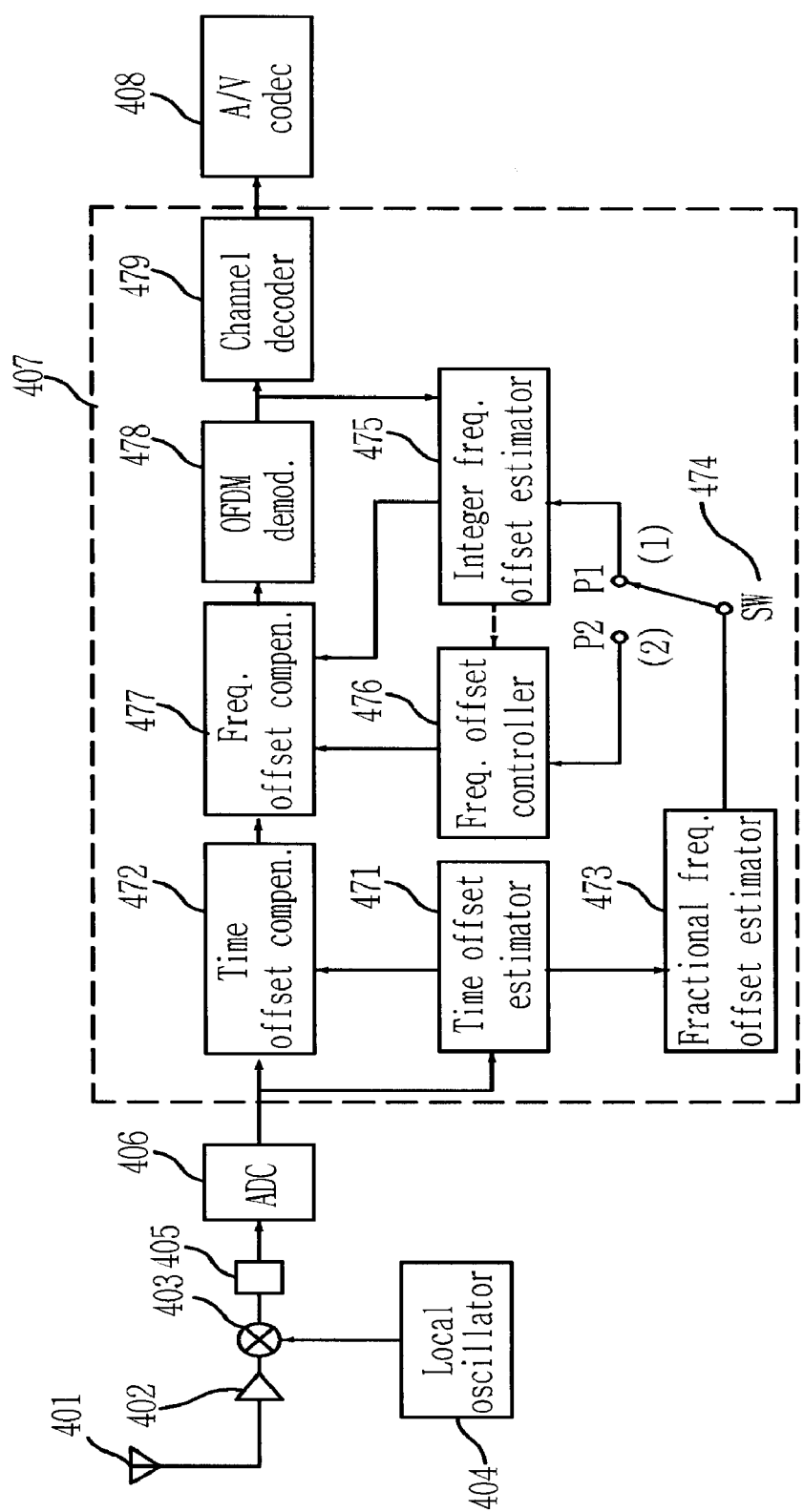
FIG. 4 is a block diagram of an apparatus for synchronizing an OFDM signal to which an open-loop frequency synchronization method is applied according to an embodiment of the present invention.

FIG. 4 is a block diagram of an apparatus for synchronizing an OFDM signal to which an open-loop frequency synchronization method is applied according to an embodiment of the present invention.

As shown in FIG. 4, the apparatus 400 according to the embodiment of the present invention comprises an antenna 401, a low noise amplifier (LNA) 402, a mixer 403, a local oscillator 404, a band pass filter 405, an analog-to-digital converter (ADC) 406, a baseband digital signal processing unit 407 and an A/V codec 408.

The LNA 402 amplifies signals received from the antenna 401.

The mixer 403 converts the signals amplified from the LNA 402 into baseband signals using clock frequencies of the local oscillator 404.

The local oscillator 404 generates clock frequencies. The band pass filter 405 extracts a specific signal from baseband signals. The ADC 406 converts the signal extracted from the band pass filter 405 into a digital signal.

The baseband digital signal processing unit 407 estimates and compensates for a frequency offset generated due to the carrier frequency difference between a transmitter and a receiver. Further, the baseband digital signal processing unit 407 estimates and compensates for a frequency shift generated due to the mobile environment of a receiver and the temperature characteristic of an oscillator. To this end, the baseband digital signal processing unit 407 comprises a time offset estimator 471, a time offset compensator 472, a fractional frequency offset estimator 473, a switch 474, an integer frequency offset estimator 475, a frequency offset controller 476, a frequency offset compensator 477, an OFDM demodulator 478 and a channel decoder 479.

The time offset estimator 471 detects a start position of a frame and a start position of an OFDM symbol with respect to a digital signal. The time offset compensator 472 compensates for the start position of the frame and the start position of the OFDM symbol. The fractional frequency offset estimator 473 estimates a fractional frequency offset.

When an integer frequency offset is estimated, the switch 474 controls an operation of the integer frequency offset estimator 475 in a periodic mode and controls an operation of the frequency offset controller 476 in a tracking mode.

The integer frequency offset estimator 475 estimates an integer frequency offset using an integer frequency offset estimation algorithm which uses a phase reference symbol (PRS) and a correlation value.

The frequency offset controller 476 estimates changes of integer frequency using a fractional frequency offset. The frequency offset compensator 477 compensates a frequency offset using the changes in frequency offset, estimated from frequency offset controller 476. The OFDM demodulator 478 converts an output signal of the frequency offset compensator 477 into a data on a frequency axis.

The channel decoder 479 corrects errors of a signal included in the data on the frequency axis. The A/V codec 408 restores the signal having the compensated frequency shift and estimation error to an audio/video signal.

Figure 5:
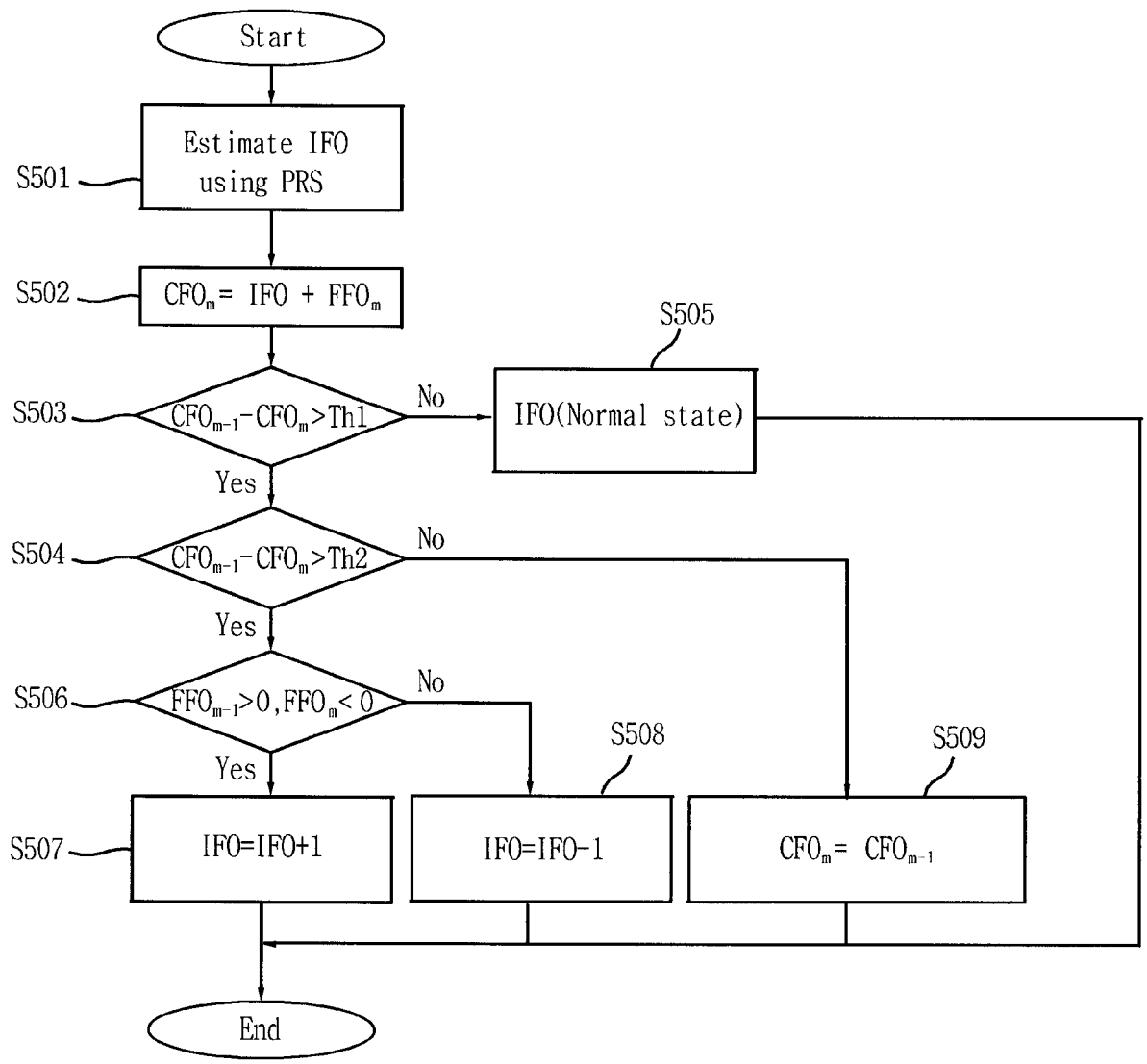
FIG. 5 is a flowchart illustrating the operation of a frequency offset controller according to the embodiment of the present invention.

FIG. 5 is a flowchart illustrating the operation of a frequency offset controller according to the embodiment of the present invention. First, in the periodic mode, a frequency offset shift is estimated using an integer frequency offset IFO estimated by the integer frequency offset estimator 475 using a PRS, a frequency offset $CFO_{m-1}$ of a previous OFDM symbol, a fractional frequency offset $FF0_m$ of a current OFDM symbol and a fractional frequency offset $FF0_{m-1}$ of the previous OFDM symbol.

As shown in FIG. 5, the integer frequency offset IFO is estimated using a PRS included in a T-DMB transmission frame (S501), and a frequency offset $CFO_m$ of the current OFDM symbol is detected by adding the fractional frequency offset $FF0_m$ of the current OFDM symbol and the integer frequency offset IFO (S502). The frequency offset controller 476 detects a difference value of the frequency offset CFO of the OFDM symbol by subtracting the frequency offset $CFO_m$ of the current OFDM symbol from the frequency offset $CFO_{m-1}$ of the previous OFDM symbol, and primarily compares the difference value of the frequency offset CFO of the OFDM symbol with a value of threshold 1 (S503).

As a result of the first comparison (S503), when the difference value of the frequency offset CFO of the OFDM symbol is greater than the value of threshold 1, the frequency offset controller 476 determines that a frequency shift and a frequency offset (FOS) estimation error are generated. Here, the frequency offset controller 476 secondarily compares the difference value of the frequency offset CFO of the OFDM symbol with a value of threshold 2 so as to determine whether the change in frequency offset is a change due to the frequency shift or a change due to the FOS estimation error (S504). When the difference value of the frequency offset CFO of the OFDM symbol is smaller than the value of threshold 1, it is determined that the integer frequency offset IFO is normal, and the error detection and compensation process is ended (S505).

The frequency offset controller 476 determines the frequency shift and FOS estimation error with respect to all the data symbols except the PRS in the T-DMB transmission frame using a characteristic that a frequency offset is not largely changed in an adjacent data symbol.

That is, the frequency offset controller 476 uses a characteristic that the fractional frequency offset FF0 of the ODFM symbol is abruptly changed when a frequency shift is generated at an estimation range boundary of the fractional frequency offset estimation algorithm. When the difference value of the frequency offset CFO of the OFDM symbol is greater than the value of threshold 2, the frequency offset controller 476 determines that the frequency shift is generated. When the difference value of the frequency offset CFO of the OFDM symbol is smaller than the value of threshold 2, the frequency offset controller 476 determines that the FOS estimation error is generated.

As a result of the second comparison (S504), when the difference value of the frequency offset CFO of the OFDM symbol is greater than the value of threshold 2, the frequency offset controller 476 determines that the frequency shift is generated. Accordingly, the frequency offset controller 476 compares the fractional frequency offset of the OFDM symbol and determines whether the frequency shift is generated in a positive drift or in a negative drift (S506). For example, when $FF0_{m-1}$ is a positive number and $FF0_m$ is a negative number, it is determined that the frequency is generated in the positive drift, and the integer frequency offset IFO is increased by 1 (S507). When it is determined that the frequency shift is generated in the negative drift, the integer frequency offset IFO is decreased by 1 (S508). Accordingly, it is possible to compensate for a frequency offset error caused by the generation of the frequency shift at a boundary point of the fractional frequency offset estimation algorithm.

On the other hand, when the difference value of the frequency offset CFO of the OFDM symbol is smaller than the value of threshold 2, it is determined that the FOS estimation error is generated, and the frequency offset is obtained by substituting the frequency offset $CFO_{m-1}$ of the previous OFDM symbol for the frequency offset $CFO_m$ of the current OFDM symbol for (S509).

Figure 6:
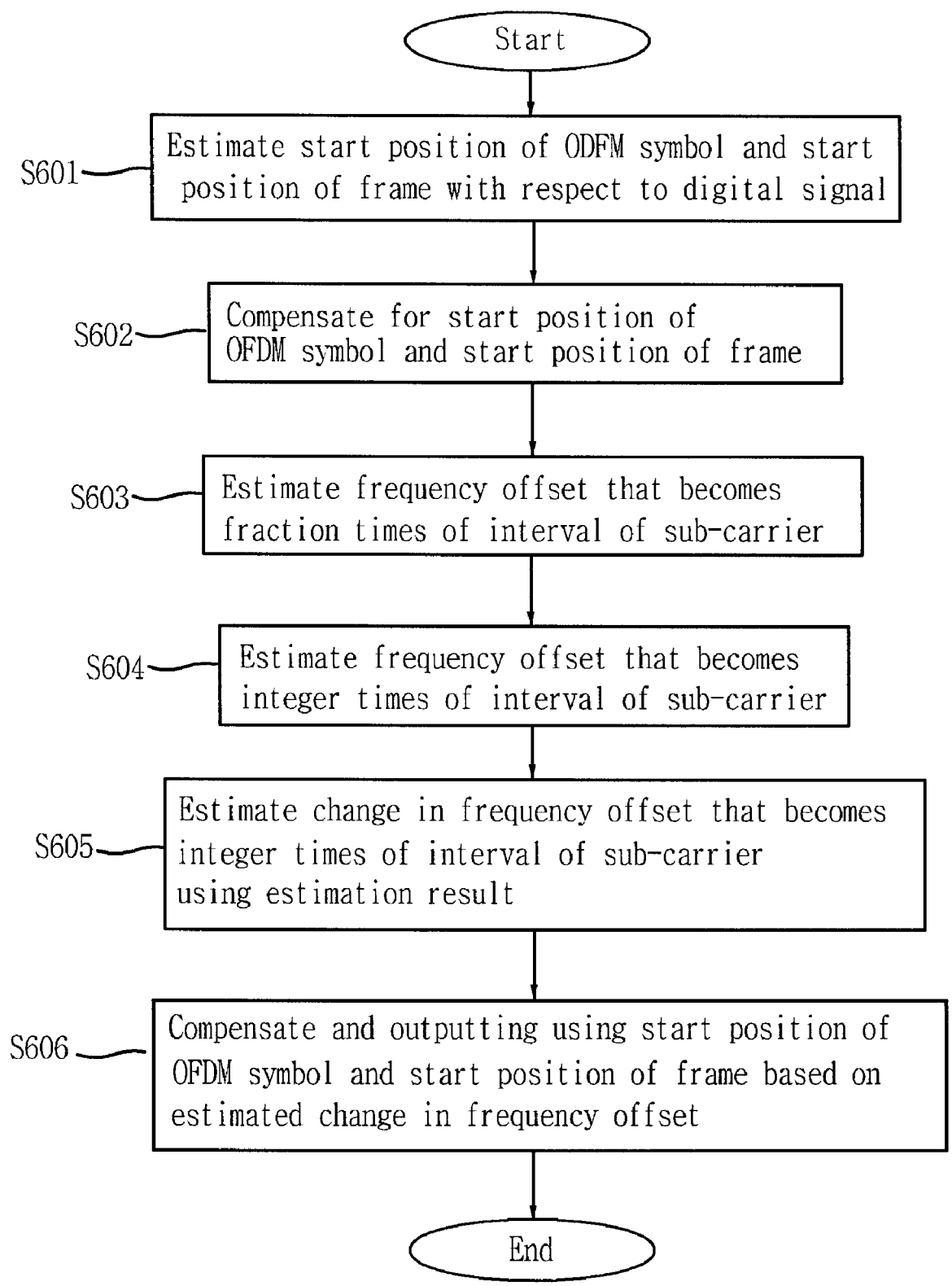
FIG. 6 is a flowchart illustrating a frequency offset estimation scheme using the apparatus for synchronizing an OFDM signal according to embodiment of the present invention.

FIG. 6 is a flowchart illustrating a frequency offset estimation scheme using the apparatus for synchronizing an OFDM signal according to embodiment of the present invention. A start position of an OFDM symbol and a start position of a frame with respect to a digital signal are estimated (S601). The start position of the OFDM symbol and the start position of the frame are compensated (S602).

A frequency offset that becomes fraction times of the interval of a sub-carrier is estimated using the frequency offset estimation result at step S601 (S603).

A frequency offset that becomes integer times of the interval of the sub-carrier is estimated using the frequency offset estimation result at step S603 (S604).

A change in frequency offset that becomes integer times of the interval of the sub-carrier is estimated using the frequency offset estimation result at step S603 (S605).

The frequency offset is compensated and outputted using the change in frequency offset, estimated at step S605 (S606).

The frequency offset estimation scheme using the apparatus for synchronizing an OFDM signal according to the present invention can be implemented in the form of program instructions implemented through various computer means and recoded in a computer-readable medium. The computer-readable medium may include program instructions, data files, data structures or combination thereof. The program Instructions recorded in the medium may be instructions specifically configured and designed for the present invention or instructions known by those skilled in the art. The computer-readable medium includes a magnetic media such as a hard disk, a floppy disk and a magnetic tape, optical media such as CD-ROM and DVD, magneto-optical media such as a floptical disk, and hardware devices such as ROM, RAM and a flash memory, which are specifically designed to store and perform program instructions. The program instructions include not only machine codes created by a compiler but also high-level language codes performed by a computer using an interpreter or the like. The aforementioned hardware device may be configured as one or more software modules for performing the operations of the present invention, and vice versa.

Although the technical spirit of the present invention has been described with reference to the accompanying drawings, the description does not limit the present invention but merely explains the preferred embodiments of the present invention. Therefore, it will be understood by those skilled in the art that various modifications and changes can be made thereto.

For example, although a T-DMB system has been described as an exemplary embodiment, the present invention is not limited thereto. Although it has been described that the present invention in the T-DMB system is operated once using a PRS per frame, the complexity of the present invention can be lowered by decreasing its operational frequency. When another system is applied, reliability of an algorithm used in the present invention can be improved by adjusting its operational frequency suitable for characteristics of the system.

Accordingly, the technical spirit of the present invention is not limited to the aforementioned embodiments, and various modifications and changes can be made thereto without departing from the spirit and scope of the invention defined by the appended claims.

What is claimed is:

1. An apparatus for synchronizing an OFDM signal using an open-loop frequency synchronization method, the apparatus comprising:
    an OFDM receiver comprising a low noise amplifier (LNA) amplifying a signal received from an antenna, a mixer converting the amplified signal into baseband signal using a clock frequency generated from a local oscillator, a band pass filter extracting and outputting a specific signal in the baseband signal, and an analog-to-digital converter (ADC) converting the extracted signal into a digital signal;
    a time offset estimator estimating a start position of an OFDM symbol and a start position of a frame with respect to the digital signal;
    a time offset compensator compensating for the start position of the OFDM symbol and the start point of the frame;
    a fractional frequency offset estimator estimating a frequency offset that becomes fraction times of an interval of a sub-carrier in response to a signal inputted from the time offset estimator;
    an integer frequency offset estimator estimating a frequency offset that becomes integer times of the interval of the sub-carrier in response to the signal inputted from the fractional frequency offset estimator;
    a frequency offset controller estimating a change in frequency offset that becomes integer times of the interval of the sub-carrier using the frequency offset that becomes fraction times of the interval of the sub-carrier; and
    a frequency offset compensator compensating the frequency offset using the start position of the OFDM symbol and the start point of the frame based on the estimated change in frequency offset.

2. The apparatus of claim 1, further comprising a switch controlling an operation of the integer frequency offset estimator and an operation of the frequency offset controller based on the estimation result of the frequency offset that becomes fraction times of the interval of the sub-carrier.

3. The apparatus of claim 1, wherein the frequency offset controller estimates a frequency offset shift using an integer frequency offset estimated by the integer frequency offset estimator using a phase reference symbol (PRS), a frequency offset of a previous OFDM symbol, a fractional frequency offset of a current OFDM symbol, and a fractional frequency offset of a previous OFDM symbol.

4. The apparatus of claim 1, wherein the frequency offset controller estimates an integer frequency offset using a PRS, and detects a frequency offset of the current OFDM symbol by adding the fractional frequency offset of the current OFDM symbol to the integer frequency offset.

5. The apparatus of claim 1, wherein the frequency offset controller detects a difference value of the frequency offset Of an OFDM symbol by subtracting a frequency offset of the current OFDM symbol from the frequency offset of the previous OFDM symbol, and determines whether or not a frequency shift and a frequency offset (FOS) estimation error are generated by comparing the difference value of the frequency offset of the OFDM symbol with a first threshold value.

6. The apparatus of claim 5, wherein the frequency offset controller determines that the frequency shift is generated when the difference value of the frequency offset of the OFDM symbol is greater than a second threshold value by comparing the difference value of the frequency offset of the OFDM symbol with the second threshold value, and determines that the FOS estimation error is generated when the difference value of the frequency offset of the OFDM symbol is smaller than a second threshold value.

7. The apparatus of claim 6, wherein the frequency offset controller determines whether the frequency shift is generated in a positive or negative drift by comparing the fractional frequency offset of the OFDM symbol when the difference value of the frequency offset of the OFDM symbol is greater than a second threshold value, and increases the integer frequency offset by 1 when the frequency shift is generated in the positive drift and decreases the integer frequency offset by 1 when the frequency shift is generated in the negative drift.

8. The apparatus of claim 6, wherein the frequency offset controller compensates for the frequency offset by substituting the frequency offset of the previous OFDM symbol for the frequency offset of the current OFDM symbol when the difference value of the frequency offset of the OFDM symbol is smaller than a second threshold value.

9. A frequency offset estimation scheme using an apparatus for synchronizing an OFDM signal,-comprising the steps of:
    (a) estimating a start position of an OFDM symbol and a start position of a frame with respect to a digital signal;
    (b) compensating the start position of the OFDM symbol and the start position of the frame;
    (c) estimating a frequency offset that becomes fractional times of an interval of a sub-carrier in response to a signal inputted at step (a);
    (d) estimating a frequency offset that becomes integer times of the interval of the sub-carrier based on the frequency offset estimation result;
    (e) estimating a change in frequency offset that becomes integer times of the interval of the sub-carrier using the frequency offset that becomes fractional times of an interval of a sub-carrier, and
    (f) compensating and outputting the frequency offset using the start position of the OFDM symbol and the start position of the frame based on the estimated change in frequency offset.

10. The frequency offset estimation scheme of claim 9, further comprising a step of controlling operations at steps (c) and (d) based on step (b).

* * * * *